April 9, 1963
A. S. PARKS
3,084,903
SHUTOFF VALVE WITH NEEDLE ELEMENT THEREIN
AND VALVE SEATING CONSTRUCTION
Filed April 11, 1961
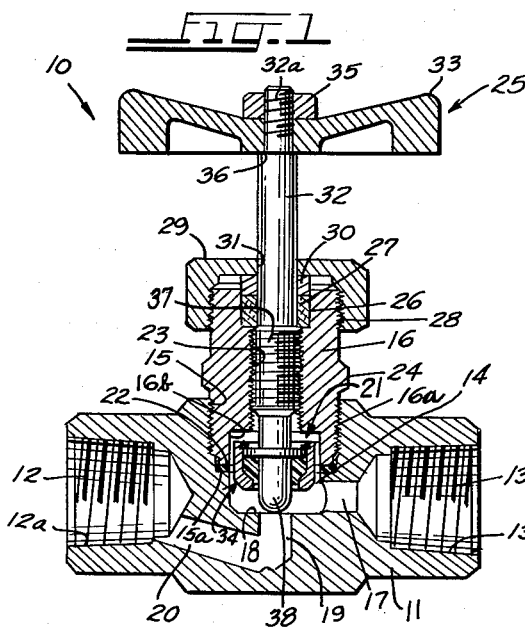
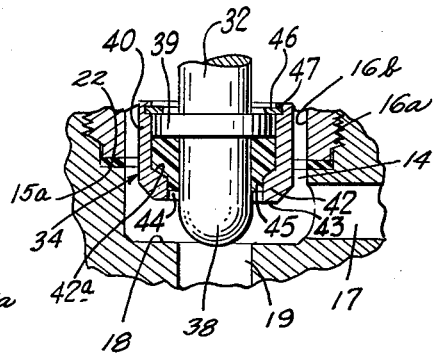
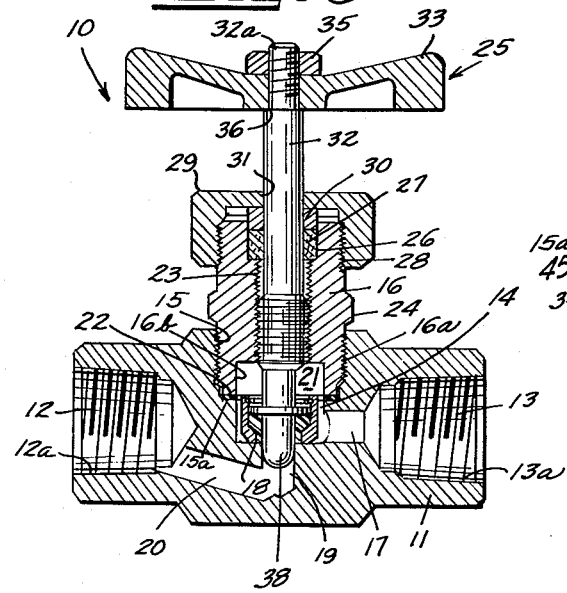
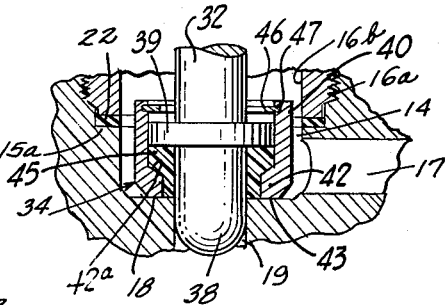
INVENTOR.
ASBURY S. PARKS United States Patent Office 3,084,903
Patented Apr. 9, 1963

3,084,903
SHUTOFF VALVE WITH NEEDLE ELEMENT THEREIN AND VALVE SEATING CONSTRUCTION
Asbury S. Parks, Houston, Tex., assignor to Clayton Mark & Company, a corporation of Delaware
Filed Apr. 11, 1961, Ser. No. 102,245
5 Claims. (Cl. 251—187)

This invention relates generally to manually operated shutoff valves and is more particularly concerned with a valve of this type employing a valve stem having a needle element thereon for gradually reducing the flow of fluid through the valve with the valve stem also carrying a new and improved valve head assembly for seating against a valve seat to provide a more efficient, long lasting and fluid-tight seal.

One of the principal problems encountered in shutoff valves presently in use flows from the inability of the valve to provide an absolutely fluid-tight seal particularly after the valve has been in use for a period of time. Thus, in the usual type of shutoff valve, a resilient or deformable washer engages a valve seat to form a seal but, after extended use, this resilient member often wears to produce leakage or dripping at the outlet of the valve. In other instances, the valve seat itself or the washer holder may become worn after extended use to cause the leakage or dripping. When leakage or dripping first occurs the problem of wear on the valve element is aggravated to some extent by the natural tendency of the operator to increase the force used to seat the valve element against its seat in an attempt to eliminate or minimize the dripping.

Another problem frequently encountered in the use of shutoff valves, particularly when controlling the flow of high pressure fluid, arises from the tendency of the valve to change rapidly from full flow conditions to complete shutoff, thus causing an abrupt stoppage of fluid flow. It would, of course, be desirable to provide a valve in which the fluid flow is gradually changed as the valve moves from the fully open position to the fully closed position or vice versa and, at the same time, to provide an efficient, long lasting, fluid-tight seal between the valve element and the valve seat with a minimum of applied manual force.

One of the primary objects of the present invention is, therefore, to provide a shutoff valve which is highly resistant to wear and which, at the same time, provides a leak-proof seal.

Another object of the invention is to provide a valve of the type described above which can be opened and closed by the application of slight manual force.

A further object of the invention is to provide a shutoff valve of the character described above which is constructed and arranged to eliminate the necessity for frequent replacement of the valve components such as the resilient sealing element or washer, and also to eliminate the necessity for resurfacing of the metal parts such as the valve seat and the sealing element holder.

The invention has for a further object the provision of a shutoff valve having the advantages described above while, at the same time, employing a valve stem carrying a needle valve element cooperating with the valve seat to effect a gradual reduction in the flow of fluid through the valve as the valve stem is moved from the open position to the closed position and to effect a gradual increase in the flow as the valve stem is moved from the closed position to the open position.

The invention has for a still further object the provision of a new and improved valve seating arrangement for use in shutoff valves of the type described above to make possible a tighter, more effective seal, while, at the same time, requiring the application of less pressure to the valve stem.

The foregoing and other objects are realized, in accordance with the present invention, by providing a shutoff valve made up of a valve body having an inlet and an outlet together wtih an opening surrounded by a flat, annular valve seat. A valve assembly cooperates with the opening and the valve seat to control the flow of fluid through the opening between the inlet and the outlet and, to this end, the valve assembly includes a valve stem having a needle valve element at one end cooperating with the opening to gradually reduce the flow of fluid between the inlet and the outlet as the valve assembly is moved from the open position to the closed position and to gradually increase the flow when the valve assembly is moved in the opposite direction. The improved valve seating arrangement of the present invention is effected by distorting or extruding a resilient packing material confined within a cylindrically shaped cage carried by and mounted for limited axial movement on the valve stem. The latter cage has an inturned flange thereon at the end nearest the valve seat and the inner diameter of the latter flange is somewhat greater than the outer diameter of the valve stem to provide an annular space through which the deformable resilient packing is extruded. The flange has a flat ring shaped outer surface for engaging the flat, annular valve seat to provide a metal-to-metal contact. The interior of the flange is beveled so that the force applied to the packing material from the valve stem acts against the beveled surface to seat the flange firmly against the valve seat. Thus as the valve assembly is turned to move the valve stem from the fully open position toward the closed position, the needle element at the end of the stem enters the opening in the valve seat to gradually decrease the flow from the inlet to the outlet until a point is reached where the ring shaped surface of the flange on the valve cage seats against the valve seat to provide the metal-to-metal contact. Further turning of the valve stem causes slight axial movement of the cage along the valve stem and applies a force against the deformable packing material to extrude a portion of this material through the annular space between the inturned flange and the valve stem until the packing material seats tightly against the annular valve seat to complete the seal.

The invention both as to its organization and manner of operation, together with further objects and advantages will best be understood by reference to the following detailed description taken in conjunction with the accompanying drawing wherein:

FIG. 1 is a longitudinal sectional view showing a shutoff valve characterized by the features of the present invention with the valve being shown in the open position;

FIG. 2 is a fragmentary, enlarged sectional view showing the valve seating construction and the needle valve element on the valve stem with the valve in the open position;

FIG. 3 is a view similar to FIG. 1 but shows the valve in the closed position; and FIG. 4 is a view similar to FIG. 2 but shows the valve in the closed position.

Referring now to the drawing and first to FIGS. 1 and 3, a shutoff valve generally indicated by the reference numeral 10 is there shown comprising a valve body 11 of substantially square cross section having an inlet chambe 12 and an outlet chamber 13 respectively formed adjacent its opposed ends. The chambers 12 and 13 are internally threaded as indicated at 12a and 13a, respectively, to receive a fitting or pipe by means of which fluid may be delivered to the inlet chamber 12 and emitted from the outlet chamber 13. The valve body 11 is drilled to form a cylindrically shaped valve recess 14 opening to an internally threaded, bonnet receiving bore 15 into which a bonnet 16 is threaded. The diameter of the bore 15 is slightly greater than that of the recess 14 thus forming an annular shoulder 15a therebetween. The valve recess 14 is connected on one side to the outlet chamber 13 through a drilled passage 17 while a drilled passage 19 extends downwardly within the valve body from the bottom 18 of the valve recess and coaxial with the latter recess for connection to the inlet chamber through an inclined passage 20 drilled in the valve body. The end of the passage 19 forms a circular port in the center of the bottom 18 of the valve chamber 14 so that the bottom of the valve recess provides a flat, annular valve seat as will be described more fully hereinafter.

The bonnet 16 is a generally cylindrical member having an externally threaded lower end portion 16a threaded into the bonnet receiving bore 15 of the valve body. A cylindrically shaped recess 16b in the lower end of the body is of substantially the same diameter as the valve recess 14 and cooperates therewith to define a valve chamber 21. An hexagonal flange 24 formed integral with the bonet 16 intermediate its ends is used to turn the bonnet into the valve body during assembly or to remove the bonnet for purposes of repair or replacement of parts. An O-ring or gasket 22 is interposed between the extreme inner end of the bonnet 16 and the shoulder 15a to provide a fluid-tight seal when the bonnet is threaded into the valve body 11. An internally threaded axial bore 23 in the bonnet 16 receives a valve stem 32 forming part of a valve assembly indicated generally by the reference numeral 25. The bore 23 extends from the recess 16b to a packing chamber 26 provided in the upper end of the bonnet to receive packing material 27 which may be compressed to seat against the valve stem 32 to form a fluid-tight seal in conventional manner. Thus, the upper end of the bonnet is externally threaded as indicated at 28 to receive a packing nut 29 which may be turned onto the bonnet in order to compress the packing material 27 through an annular gland 30 the lower end of which extends into the recess 26 and the upper end of which seats against the packing nut to space the latter slightly from the outer end of the bonnet. The packing nut 29, of course, has an hexagonally shaped periphery to facilitate the turning of the nut onto the threaded portion 28 and this nut is provided with a central aperture 31 through which the valve stem 32 passes.

The valve assembly 25 includes, in addition to the stem 32, a valve handle 33 and an inner valve head indicated generally by the reference numeral 34. The valve handle 33 is secured to the outer end of the valve stem in conventional manner as, for example, by means of a lock nut 35 threaded onto an externally threaded reduced diameter portion 32a at the upper end of the valve stem. The valve handle is thus clamped between the lock nut and an annular shoulder 36 formed on the valve stem by the reduced diameter portion 32a. The valve stem 32 has an integrally formed, externally threaded, enlarged diameter portion 37 which is threaded into the axial bore 23 in the valve bonnet so that the valve stem is moved axially with respect to the bonnet 16 as the handle 33 is turned, the direction of axial movement, of course, being determined by the direction in which the handle is operated. The extreme lower end portion 38 of the valve stem is of somewhat smaller diameter than the main body and is curved or shaped to form a needle valve element which cooperates with the passage 19 to form a needle valve for controlling the flow of fluid from the inlet chamber 12 to the outlet chamber 13 in a manner described more fully below. An annular collar or piston 39 is carried in fixed position near the lower or inner end of the valve stem 32 for a purpose which will become evident as the description proceeds.

The valve head 34 includes a cylindrical cage 40 having an outer diameter somewhat smaller than the diameter of the valve chamber 21 so that the valve cage is free to move axially of the bonnet 16 when the valve stem is turned. The inner diameter of the cage 40 is slightly greater than the outer diameter of the annular collar 39 to permit axial movement of the cage with respect to the valve stem. The lower end of the cylindrical cage 40 is turned in to form an annular flange 42 having a ring shaped flat portion 43 at the bottom for seating against the annular valve seat 18 in order to provide a metal-to-metal seal when the valve assembly 25 is closed. The inner diameter of the flange 42 is somewhat greater than the outer diameter of the lower end 38 of the valve stem, thus forming an annular space 44 between these elements. The flange 42 is also provided with a beveled surface 42a tapering downwardly and inwardly from the cage 40 towards the valve stem 32a. The flange 42 cooperates with the cage 40, the valve stem 32 and the annular collar 39 to define a packing chamber for accommodating a resilient, deformable or extrudable packing material 45 formed of any suitable material such as Teflon, a trademark of E. I. du Pont de Nemours and Co. for a plastic material formed of a tetrafluoroethylene polymer. The packing material 45 completely fills the packing chamber described above but when the valve is in the open position shown in FIGS. 1 and 2, the annular space 44 restricts the packing material so that it does not extend beyond the plane of the ring shaped surface 43 at the bottom of the cylindrical cage. The cage 40 is retained on the valve stem by means of a retaining ring 46 having its outer periphery extending into an annular groove 47 formed in the valve cage and having its inner edge overlying the annular collar 39. With the valve in the open position shown in FIGS. 1 and 2, the packing material 45 seats against the beveled surface 42a of the inturned flange 42 to hold the ring 46 against the upper face of the annular collar 39. When the valve is in the open position, the valve head 34 including the cylindrical cage 40 is disposed within the recess 16b in the lower end of the bonnet 16, so that the needle valve element 38 is completely withdrawn from the passage 19 and, as a consequence, the fluid entering the inlet chamber 12 is free to flow unrestrictedly through the passage 20, through the passage 19, through the valve chamber 21, and through the passage 17 to the outlet chamber 13. In order to close the valve, the handle 33 is turned to thread the enlarged diameter portion 37 of the valve stem into the axial bore 23 in the bonnet, thus moving the valve head 34 toward the passage 19 and the valve seat 18. As the tapered lower end or needle valve element 38 of the valve stem enters the passage 19, the fluid flow between the inlet and the outlet is gradually restricted until the passage 19 is almost completely closed by the time the flat ring shaped surface 43 on the lower end of the valve head seats against the valve seat 18 to provide the metal-to-metal seal referred to above. Continued turning of the handle 33 applies a force on the packing material 45 axially of the valve stem through the action of the annular collar 39 acting against the top of the packing material. Since the packing material is of a deformable or extrudable material, it will transmit the applied force to the beveled surface 42a, thus enhancing the metal-to-metal contact, and, at the same time, a portion of the packing material will be extruded through the annular space 44 by the applied axial force until the extreme lower end of this packing material seats against the flat, annular valve seat 18 to provide a highly efficient, fluid-tight seal. The axial movement of the valve stem to extrude the packing material 45 results in movement of the annular collar 39 out of engagement with the retaining ring 46, since the cage 40 cannot move beyond the point where the metal-to-metal contact is established. When the valve assembly 25 is moved to the open position by threading the valve stem out of the bore 23, the packing material 45 first contracts into the annular space 44 to break its seal with the valve seat 18 and then the flat face 43 moves away from the valve seat 18 to break the metal-to-metal contact. Continued opening of the valve assembly draws the needle valve element 38 out of the passage 19 and gradually increases the flow to the outlet chamber 13.

In view of the foregoing description, it will be recognized that after the metal-to-metal contact has been established, there is no further turning of the valve head 34 and thus neither the metal face 43 nor the lower end of the packing material 45 are subjected to wiping or twisting against the valve seat 18 and, as a result, the faces of these elements will not be subjected to wear or abrasion. Accordingly, the fluid-tight seal effected by these components will remain effective for an extremely long operating life. Moreover, even if the lower end of the packing material should become worn after extended use, the worn material will be replaced by further advancement of the packing material from the packing chamber within the cage 40 due to the downward movement of the valve stem and the annular collar 39 carried thereby. Moreover, the metal parts effecting the metal-to-metal contact, namely, the valve seat, and the cylindrical cage, may be made of a material such as brass which will wear more poorly than the packing material 45 so that the packing material will never require replacement. The elements of the valve may be so designed that the stress on the packing material 45 will never reach a value sufficient to destroy either the valve material or the cylindrical cage thus avoiding the possibility of damaging these components due to application of excessive force to the valve handle 33.

While a particular embodiment of the invention has been shown and described, it will be recognized that many changes and modifications will readily occur to those skilled in this art and it is, therefore, contemplated by the appended claims to cover any such modifications as fall within the true spirit and scope of the invention.

What is claimed as new and desired to be secured by Letters Patent of the United States is:

1. A valve, including in combination, a valve body having a port and a flat valve seat surrounding the port, a valve assembly movable in opposite directions relative to said seat and port to control flow through the port, said assembly comprising a stem extending coaxially with the port and axially movable towards and away from the valve seat and having at its lower end a needle valve element movable into said port and having a region dimensioned to fit closely within the port, said stem having a longitudinally extending portion lying immediately adjacent said element and also dimensioned to fit closely within the port, piston means carried by said stem in fixed position spaced from said needle valve element, means including a substantially cylindrical element surrounding said piston means and at least part of said portion of said stem to define an annular packing chamber extending around said stem and at least part of said stem portion, said cylindrical element having limited movement axially with respect to the valve stem and piston means and including structure at one end forming a restricted annular opening from said packing chamber encircling said stem opposite the valve seat and an exterior flat seating surface encircling said opening for engaging the valve seat, said cylindrical element also having a bevelled portion therein adjacent said annular opening and extending radially outwardly and away from said one end, a packing of resilient, extrudable material substantially filling and confined within said chamber, said stem, piston and packing effecting movement of said cylindrical element during initial closing movement of said assembly to engage said exterior surface with said valve seat around said port, and said stem and piston means thereafter acting through said packing only to force the exterior seating surface of said cylindrical element against the valve seat and also extruding said packing through said annular opening and longitudinally along the periphery of said portion of said stem during subsequent closing movement thereof due to continued axial movement of the stem in closing direction after engagement of said surface with said valve seat, thereby to force the packing against the valve seat to complete a seal with said packing confined within said chamber by the chamber defining means, the said stem portion fitting closely within the port and the valve seat.

2. A valve, including in combination, a valve body having a port and a flat valve seat surrounding the port, a valve assembly movable in opposite directions relative to said seat and port to control flow through the port, said assembly comprising a stem axially movable towards and away from the valve seat, said stem including a longitudinally extending portion dimensioned to fit closely within said port, piston means on and axially movable with said stem, means including a substantially cylindrical element surrounding said piston means and having limited movement axially with respect to the valve stem and defining a packing chamber extending around said stem and around at least part of said stem portion, said last mentioned means including structure at one end forming a restricted annular opening from said packing chamber encircling said stem and located opposite the valve seat and also forming an exterior seating surface encircling said opening for engaging the valve seat, a packing material substantially filling and confined within said chamber, means including said stem and piston means within said cylindrical element for effecting movement of said cylindrical element through said packing during initial closing movement of said assembly to engage said exterior surface with said valve seat around said port, and thereafter applying force to said packing through said piston means during subsequent closing movement due to continued axial movement of the stem and piston means in closing direction after engagement of said surface with said valve seat, said force being effective to force the packing against the valve seat to complete a seal with said packing confined within said chamber by said valve seat, the close fit between said portion of said stem within said port and said chamber defining means.

3. The structure defined by claim 2 wherein said cylindrical element also has a bevelled portion therein adjacent said annular opening and extending radially outwardly and away from said one end.

4. A valve, including in combination, a valve body having a port and a flat valve seat surrounding the port, a valve assembly movable in opposite directions relative to said seat and port to control flow through the port, said assembly comprising a stem extending coaxially with the port and axially movable towards and away from the valve seat and having at its end a needle valve element movable into said port and having a region dimensioned to fit closely within the port, said stem having a longitudinally extending portion immediately adjacent said element and also dimensioned to fit closely within said port, piston means carried by said stem in fixed position spaced from said needle valve element, means including a substantially cylindrical element surrounding said piston means and at least part of said portion of said stem to define an annular packing chamber extending around said portion of said stem, the cylindrical element having limited movement axially with respect to the valve stem and piston means and including structure at one end forming a restricted annular opening from said packing chamber encircling and immediately adjacent said portion of said stem and an exterior seating surface encircling said opening for engaging the valve seat, said annular opening facing said valve seat, a packing of resilient, extrudable material substantially filling and confined with said chamber, said portion of said stem being movable into said port during movement of said valve assembly in a valve closing direction to restrict the flow through the port and said portion when in the valve closing position also extending longitudinally of said stem from the end thereof beyond the valve seat, said stem, piston and packing effecting movement of said cylindrical element during initial closing movement of said assembly to engage said exterior surface with said valve seat around said port, and said stem and piston means thereafter applying force to said packing during subsequent closing movement of the assembly due to continued axial movement of the stem and piston means in closing direction after engagement of said surface with said valve seat, thereby to force the packing against the valve seat to complete a seal with said packing confined within said chamber by said seat, the close fit of said stem portion within the port and the chamber defining means, the close fit of said stem portion within said port preventing movement of packing material into said port.

5. The structure defined by claim 4 wherein said cylindrical element also has a bevelled portion therein adjacent said annular opening and extending radially outwardly and away from said one end.

References Cited in the file of this patent

UNITED STATES PATENTS

| | | |
|---|---|---|
| 763,208 | Robinson | June 21, 1904 |
| 1,697,516 | Hele-Shaw | Jan. 1, 1929 |
| 2,308,269 | Cravens | Jan. 12, 1943 |
| 2,403,028 | Smith | July 2, 1946 |
| 2,595,012 | Smith | Apr. 29, 1952 |
| 2,692,750 | Davis | Oct. 26, 1954 |
| 2,885,176 | Bryant | May 5, 1959 |
| 2,885,177 | Helsing | May 5, 1959 |
| 2,924,421 | Pohndorf | Feb. 9, 1960 |
| 2,936,154 | Von Platen | May 10, 1960 |

FOREIGN PATENTS

| | | |
|---|---|---|
| 13,497 | Great Britain | Apr. 1, 1909 |
| 22,423 | Great Britain | Oct. 1, 1909 |
| 322,147 | Great Britain | Nov. 28, 1909 |